(12) United States Patent
Morbach et al.

(10) Patent No.: US 6,505,882 B1
(45) Date of Patent: Jan. 14, 2003

(54) HATCHBACK LID FOR MOTOR A VEHICLE

(75) Inventors: Nick Morbach, Aschaffenburg (DE); Carsten Hofer, Grossostheim (DE); Werner Schmidt, Alzenau (DE); Matthias Kraus, Bad Homburg (DE); Stephan Schutt, Goldbach (DE)

(73) Assignee: Magna Europa AG, Oberwaltersdorf (AT)

( * ) Notice: Subject to any disclaimer, the term of this patent is extended or adjusted under 35 U.S.C. 154(b) by 0 days.

(21) Appl. No.: 09/645,213

(22) Filed: Aug. 24, 2000

(30) Foreign Application Priority Data

Aug. 24, 1999 (AT) .................................... 564/99 U

(51) Int. Cl.⁷ .................................................. B60J 5/00
(52) U.S. Cl. ............................ 296/146.11; 296/146.8; 296/146.13; 49/383; 49/398
(58) Field of Search ........................ 296/146.13, 146.8, 296/50, 56, 57.1, 76, 106, 146.11; 49/398, 383; 160/229.1, 206, 213, 207

(56) References Cited

U.S. PATENT DOCUMENTS

| | | | | |
|---|---|---|---|---|
| 2,113,291 A | * | 4/1938 | Clark et al. ................... 160/189 |
| 2,911,253 A | * | 11/1959 | Dewey ........................ 296/39.1 |
| 3,063,747 A | * | 11/1962 | Anderson ............... 296/57.1 X |
| 3,618,656 A | * | 11/1971 | Young et al. ................ 160/207 |
| 3,749,440 A | * | 7/1973 | Lathers ................... 296/57.1 X |
| 3,815,950 A | * | 6/1974 | McKenzie et al. ............. 296/56 |
| 4,295,514 A | * | 10/1981 | Johnson ........................ 160/206 |
| 4,609,027 A | * | 9/1986 | Keller .......................... 160/207 |
| 4,877,281 A | * | 10/1989 | Altmann ..................... 296/39.1 |
| 5,168,914 A | * | 12/1992 | Keller .......................... 160/207 |
| 5,215,345 A | * | 6/1993 | Orphan ........................ 296/39.1 |
| 5,601,131 A | * | 2/1997 | Morris ......................... 160/207 |
| 5,724,837 A | * | 3/1998 | Shin ............................. 160/213 |
| 5,921,611 A | * | 7/1999 | Townsend .................... 296/106 |
| 5,992,918 A | * | 11/1999 | Gobart et al. ........... 296/146.13 |
| 6,068,327 A | * | 5/2000 | Junginger .............. 296/146.13 |
| 6,189,748 B1 | * | 2/2001 | Hutter et al. .................. 296/51 |
| 6,199,617 B1 | * | 3/2001 | Schweiss ..................... 160/193 |

FOREIGN PATENT DOCUMENTS

EP          0 774 370 A2     5/1997

\* cited by examiner

*Primary Examiner*—D. Glenn Dayoan
*Assistant Examiner*—Lori L. Coletta
(74) *Attorney, Agent, or Firm*—Clark Hill PLC

(57) ABSTRACT

A hatchback lid for a motor vehicle with a top and a bottom hatchback lid part (5, 6) displaceably mounted in relation to each other. The top hatchback lid part (5) is jointed with the bottom hatchback lid part (6) in such a way that the two hatchback lid parts (5, 6) can be folded together into a completely open position.

11 Claims, 3 Drawing Sheets

HATCHBACK LID FOR MOTOR A VEHICLE

FIELD OF THE INVENTION

The invention concerns a hatchback lid for a motor vehicle with a top and a bottom hatchback lid part displaceably mounted in relation to each other.

DESCRIPTION OF THE RELATED ART

Besides the common one-piece roof-mounted hatchback lids whose disadvantages are no doubt widely known, especially the necessary stepping-back for opening, the restricted standing height due to the limited opening angle, the problematic opening in tight parking spaces or in garages, there are also already known to be hatchback lid constructions with two parts, some of which have also been produced. One of these constructions provides a top and a bottom hatchback lid part which are mounted on the top and bottom of the hatchback opening and can be swivelled. With such a solution, the top and bottom hatchback lid parts can only be opened one after another, and usually two hands are necessary for opening.

Two-part hatchback lid parts are also known where the two hatch lid parts are laterally mounted on the hatchback opening and can be swivelled open and closed. In this case, both lid parts can also only be opened one after another and usage of the loading space in tight parking spaces is still uncomfortable. With an opening angle over 90° there is the further possibility of endangering other road-users. Also, the opening and closing can be problematic with wind load.

A hatchback lid for a motor vehicle is known from EP-A 0 774 370 which consists of a hatchback lid frame that can be swivelled from a closed to an open position. With this hatchback lid frame, at least one bottom sliding element is held in a sliding track which makes it possible to open a bottom lid area while the hatchback lid frame is closed. This construction can also contain a top sliding element for opening a top lid area which is attached to the hatchback lid frame and can be moved downwards. This is supposed to create a simply constructed hatchback lid which enables a comfortable and easy access to the bottom loading sill of the hatchback opening. However, with larger objects it is still necessary to swivel the total hatchback lid upwards in the usual manner in order to be able to use the complete hatchback opening for loading.

SUMMARY OF THE INVENTION

The purpose of this invention consists of producing a simply constructed two-part hatchback lid which does not contain the disadvantages of the known solutions and which particularly requires very little space backwards and upwards at opening. Furthermore, it should be constructible in a very simple way and also permit an ergonomically advantageous operation.

The invention solves this task by having the top hatchback lid part jointed with the bottom part in such a way that the two hatchback lid parts can be folded together into the open position.

Thus, a hatchback lid constructed according to the invention requires considerably less space for opening than the other known solutions. Concerning their mass and lever ratios, the two hatchback lid parts can be designed in such a way as to be constructed very simply and to be operated comfortably. The joint connection of the two foldable hatchback lid parts creates very good ergonomic conditions, e.g. the possibility of single-handed operation and, depending on the design, also the possibility of fully automated opening and closing.

In a preferred construction design of the invention, the top hatchback lid part as well as the bottom hatchback lid part are jointed and displaceably mounted in the lateral edge areas of the hatchback opening. This arrangement allows for a variable opening operation of the hatchback lid.

This construction form can now provide for a top resting position at the top edge of the hatchback opening area for the foldable hatchback lid parts.

Alternatively or additionally, a bottom resting position can be provided at the bottom edge of the hatchback opening for the foldable hatchback lid parts.

Both resting positions have advantages: for instance, in the top resting position, an unobstructed access to the hatchback opening for opening and closing is possible. In the bottom resting position, an additional shelf space can thus be provided. The latter is the case especially when, in the bottom resting position, the two folded-up hatchback lid parts have at least an approximate horizontal position and the top hatchback lid part can at least partially be covered by a protective carpet (or similar) which could be pulled out from the trunk.

In another simpler construction variation according to the invention, the top hatchback lid part is mounted onto the top edge area of the hatchback opening and can be swivelled.

In this case, the bottom hatchback lid part can be jointed and displaceably mounted on the lateral edge areas of the hatchback opening. This offers the advantage of a track for the bottom hatchback lid part.

Alternatively or additionally (in both construction variations), the bottom hatchback lid part can be connected to the top hatchback lid part via spring/damping elements or similar. This measure allows for a comfortable operation of the hatchback.

In order to have the hatchback opening completely available for loading and unloading and without any protruding hatchback part, it can additionally be provided to swivel the folded-up hatchback lid part in the direction of or onto the car roof.

BRIEF DESCRIPTION OF THE DRAWINGS

Further characteristics, advantages and details of the invention will now be described in the drawing which contains several representations of oblique views of a car hatch area. The following items are shown in the figures.

DETAILED DESCRIPTION OF THE PREFERRED EMBODIMENTS

Figure 2:
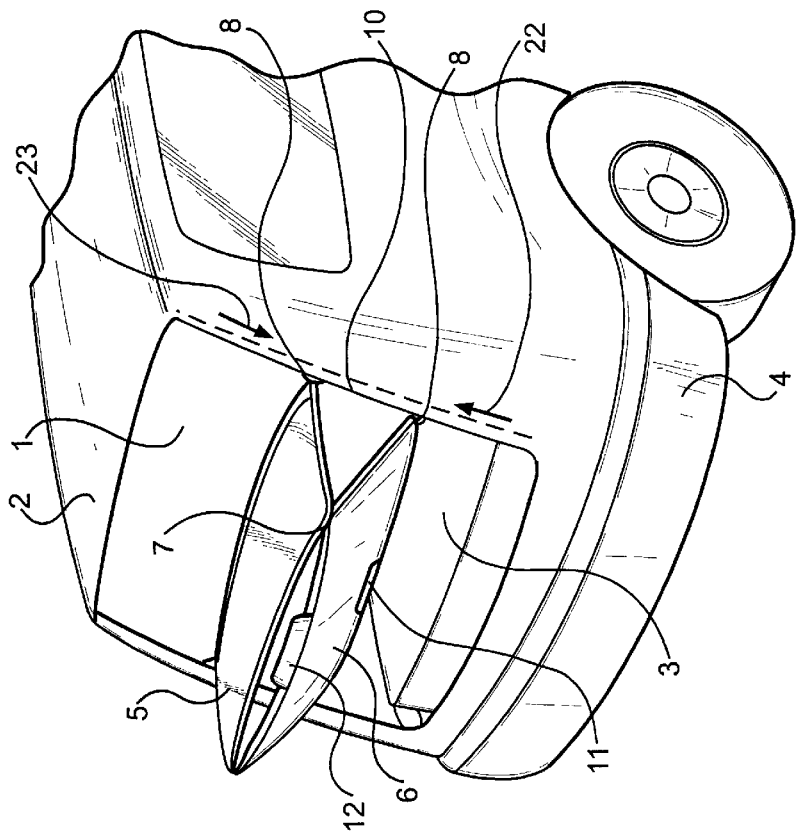
FIG. 2 is a perspective view of the first construction form of the hatchback lid in an intermediate position during the opening process.

In the individual drawing figures, 1 designates the hatchback door opening of the car body, 2 the car roof, 3 the bottom of the rear trunk space and 4 the rear bumper.

A hatchback lid constructed according to the invention is composed of a top hatchback lid part 5 and a bottom hatchback lid part 6 which are basically designed to the same size. The top hatchback lid part 5 is designed as a transparent panel, made of plastic or glass, or is provided with such a panel. The bottom hatchback lid part 6 can be constructed in the common fashion, thus consisting of automotive body sheets and/or plastic.

The two hatchback lid parts 5, 6 are joined together in the central area of the hatchback opening 1. In the slightly curved or bowed design of the hatchback lid parts 5, 6 represented in the drawing figures, two joint connections 7 (FIG. 2) are found between the adjoining edge areas of the hatchback lid parts 5, 6. As particularly shown in FIG. 2, guide elements 8 are respectively provided on the two further edge areas of the hatchback lid parts 5, 6, the guide elements' construction not being represented any further than this. The guide elements 8 are mounted on the coulisses 10 which are only indicated in the drawing figures and are positioned at the two lateral edge areas of the car hatchback opening 1. Thus, the hatchback lid parts 5, 6 are arranged in such a way that they can be moved from top to bottom and vice versa.

Figure 1:
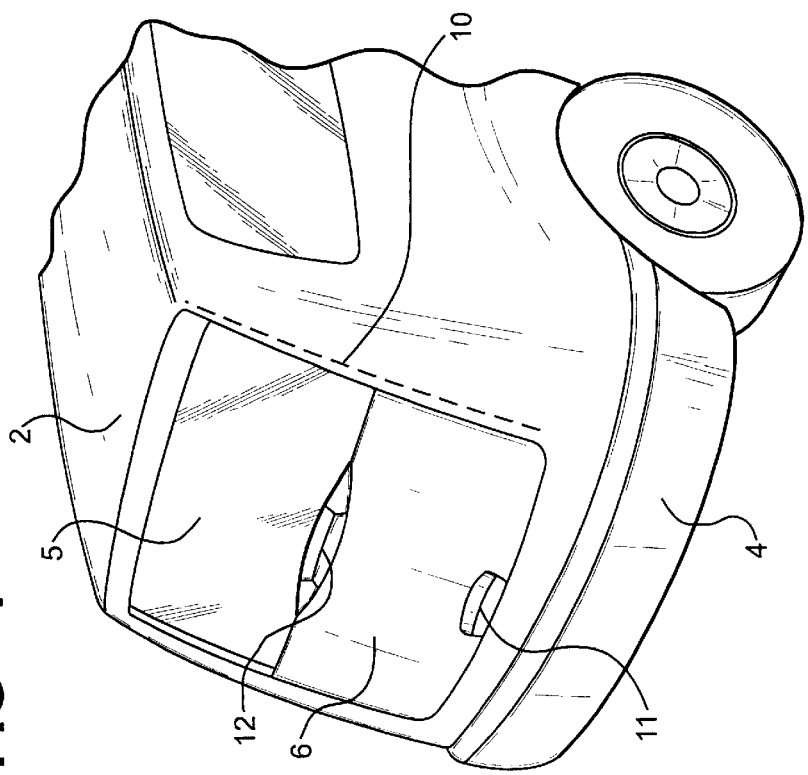
FIG. 1 is a perspective view of the hatch area of the car with the hatchback lid being closed.

In FIG. 1, where the closed position of the hatchback lid parts 5, 6 is represented, a handle recess 11 can also be seen which is attached to the bottom hatchback lid part 6 there could also be a lock (not represented) at the same spot, as well as a handle 12 for manual operation of the two hatchback parts 5, 6. In the represented design, the handle is situated on the top edge of the bottom hatchback lid part 6.

For opening the hatchback lid, the two hatchback lid parts 5, 6 are brought into the position shown in FIG. 2 by pulling the handle 12 after having unlatched the lock (not represented). Thus the top and bottom hatchback lid parts 5, 6 are folded together from a mutual movement around the joint connections 7 and also from the sliding movement in the coulisses 10 sufficiently enough so that a certain acute angle remains between the top and bottom hatchback lid parts 5, 6. In this position, using appropriate mechanisms (not represented) will ensure that the hatchback parts 5, 6 cannot fold together completely. Afterwards, the hatchback lid can either be slid upwards (see arrow 22 in FIG. 2) or downwards (see arrow 23 in FIG. 2). When slid upwards, the position shown in FIG. 3 is achieved where both hatchback lid parts 5, 6 take on an almost completely folded-up position.

Figure 4:
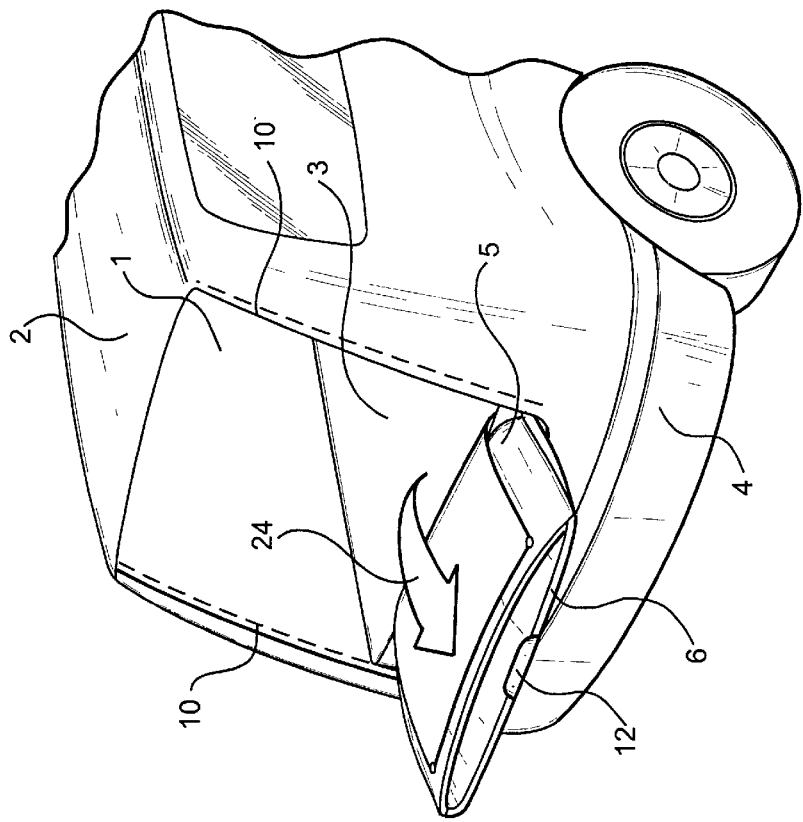
FIG. 4 is a perspective view of the hatchback lid according to FIG. 2 in its bottom resting position.

The two hatchback parts 5, 6 are folded up completely at reaching the bottom resting position also when slid downwards, shown in FIG. 4. There are appropriate devices (not represented) provided which can include spring elements, dampers or electric motors. These support a mutual folding-up of the two hatchback parts 5, 6 in closing the hatchback opening from the top or bottom resting position. It is also ensured that the two hatchback lid parts 5, 6 remain in their respective positions when being released by using an appropriate mechanism.

Figure 3:
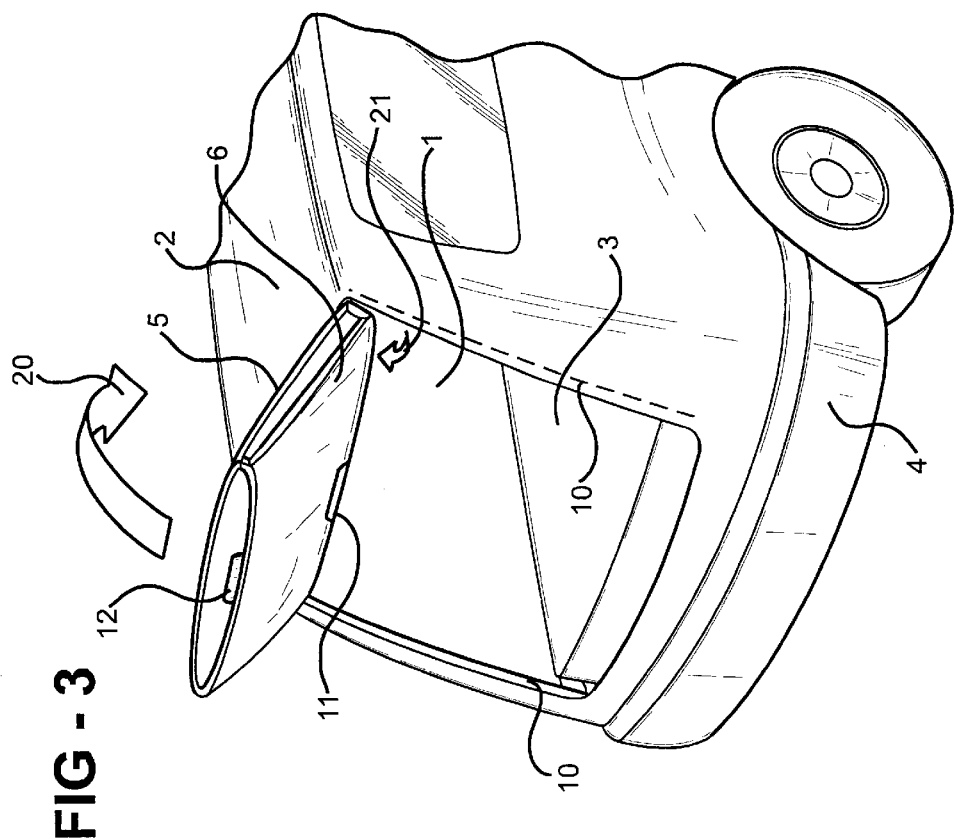
FIG. 3 is a perspective view of the hatchback lid according to FIG. 2 in its top resting position.

Starting from the top resting position in FIG. 3, a swivelling of the folded-up hatchback lid parts 5, 6 can additionally be swivelled towards or onto the car roof 2 by using swivel bearings. This additional function is indicated in FIG. 3 through the arrows 20 and 21.

As can bee seen in FIG. 4, the completely folded-up hatchback lid can be additionally used as a trunk sill, shelf, seat area or similar when in the bottom resting position For this, a protective carpet (or similar) can be provided which could be pulled out from the floor bottom 3 (see arrow 24 in FIG. 4) which would protect the top hatchback lid part 5 (made of transparent material, glass or plastic) from being damaged.

Figure 5:
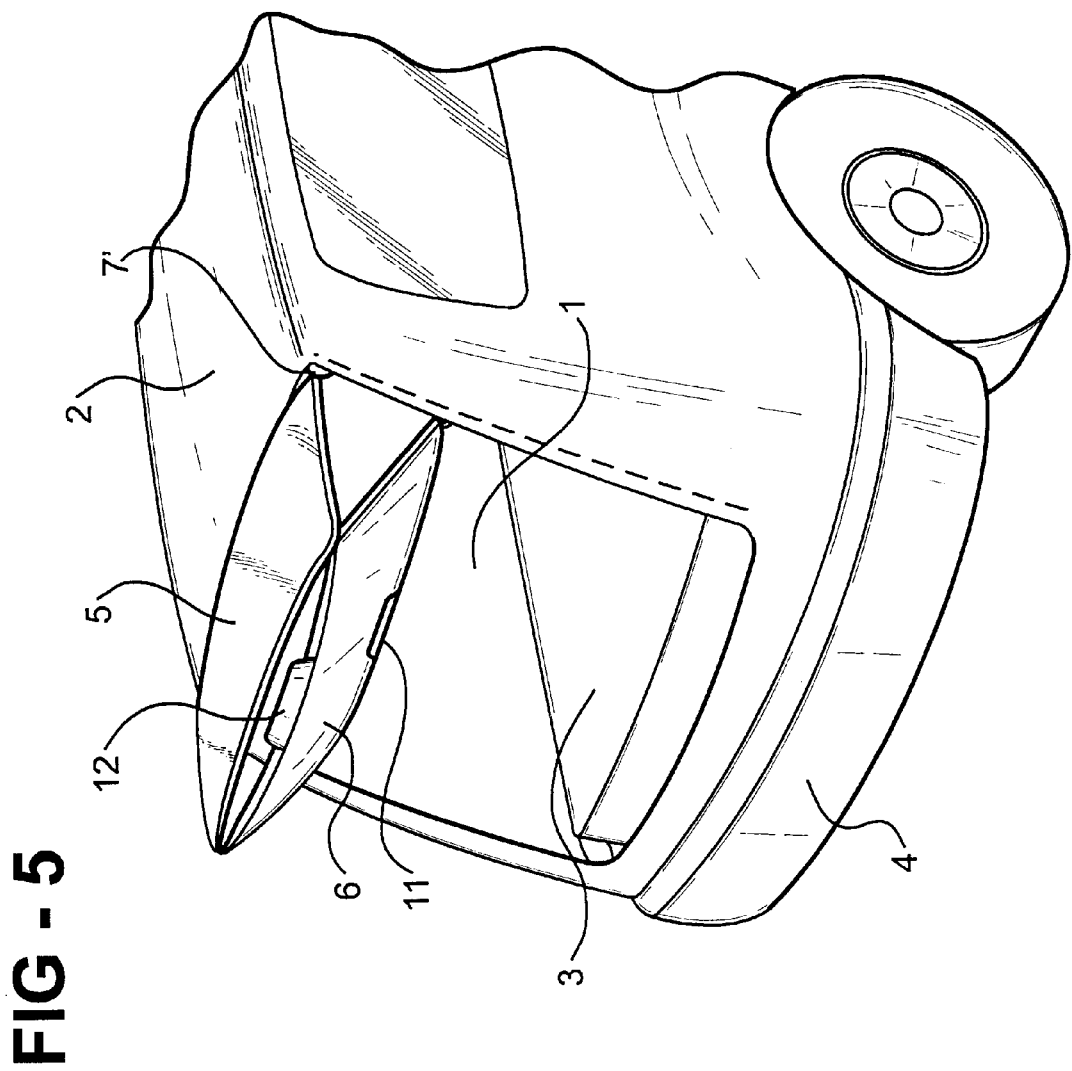
FIG. 5 is a perspective view of the second construction form of the hatchback lid in an almost completely opened position.

FIG. 5 shows another construction form of the arrangement of the two jointed hatchback lid parts 5, 6 on the hatchback opening 1. However, the top hatchback lid part 5 is mounted on the top edge area of the hatchback opening 1 in such a way that it can be rotated through joint connections 7' but cannot be slid. The second bottom hatchback lid part 6 can now either be displaceably mounted via joint connections in lateral coulisses, as in the model type already described, or it can be jointed with the hatchback lid part 6 without any separate lateral guide. In this case, for instance, it is intended that the top and the bottom hatchback lid parts 5, 6 be connected via an appropriate spring/damper arrangement which can be constructed in a common way.

In this construction variation, there is only a top resting position provided while it is also ensured in this instance that the position adapted by both hatchback lid parts 5, 6 cannot change unintentionally or on their own.

The invention is not restricted to the represented and described models. For instance, it is possible to construct the hatchback lid part only slightly curved or not at all, and to also provide a joint connection in the middle between the hatchback lid parts.

What is claimed is:

1. A hatchback lid for opening and closing a hatchback opening of a motor vehicle comprising:
    a top hatchback lid part;
    a bottom hatchback lid part;
    a first guide element adapted to pivotally connect said top hatchback lid part to the hatchback opening of the vehicle for pivoting said top hatchback lid part between an open position and a closed position covering at least a portion of the hatchback opening and adapted to slidably connect said top hatchback lid part to the hatchback opening such that said top hatchback lid part slides along the hatchback opening between said closed position and said open position in response to said top and bottom hatchback lid parts being folded between a flat planar position and a folded overlapping position;
    a second guide element adapted to pivotally connect said bottom hatchback lid part to the hatchback opening of the vehicle for pivoting said bottom hatchback lid part between an open position and a closed position covering the remaining portion of the hatchback opening; and
    a joint connection pivotally interconnecting said top hatchback lid part and said bottom hatchback lid part such that said top and bottom hatchback lid parts are foldable between said generally flat planar aligned position when said top and bottom hatchback lid parts are pivoted to said closed positions, and said folded overlapping position when said top and bottom hatchback lid parts are pivoted to said open positions.

2. A hatchback lid as set forth in claim 1 wherein said second guide element is adapted to slidably connect said bottom hatchback lid part to the hatchback opening such that said bottom hatchback lid part slides along the hatchback opening between said closed position and said open position in response to said top and bottom hatchback lid parts being folded between said flat planar position and said folded overlapping position.

3. A hatchback lid as set forth in claim 2 wherein said top hatchback lid part includes top and bottom edges and opposite lateral side edges and said bottom hatchback lid part includes top and bottom edges and opposite lateral side edges.

4. A hatchback lid as set forth in claim 3 wherein said joint connection hingedly interconnects at least a portion of said bottom edge of said top hatchback lid part with at least a portion of said top edge of said bottom hatchback lid part.

5. A hatchback lid as set forth in claim 4 wherein said first guide element pivotally connects each of said opposite lateral side edges of said top hatchback lid part to lateral side edge areas of the hatchback opening.

6. A hatchback lid as set forth in claim 5 wherein said second guide element pivotally connects each of said opposite lateral side edges of said bottom hatchback lid part to the lateral side edge area of the hatchback opening.

7. A hatchback lid as set forth in claim 6 wherein said first guide element slidably couples each of said opposite lateral side edges of said top hatchback lid part to the lateral side edge areas of the hatchback opening.

8. A hatchback lid as set forth in claim 7 wherein said second guide element slidably couples each of said opposite lateral side edges of said bottom hatchback lid part to the lateral side edge area of the hatchback opening.

9. A hatchback lid as set forth in claim 8 wherein said first and second guide elements provide sliding movement of said hatchback lid in said folded overlapping position between a completely open position adjacent the top of the hatchback opening and a bottom resting position adjacent the bottom of the hatchback opening.

10. A hatchback lid for opening and closing a hatchback opening of a motor vehicle comprising:

a top hatchback lid part;

a bottom hatchback lid part;

a first guide element adapted to pivotally connect said top hatchback lid part to the hatchback opening of the vehicle for pivoting said top hatchback lid part between an open position and a closed position covering at least a portion of the hatchback opening and adapted to slidably connect said top hatchback lid part to the hatchback opening such that said top hatchback lid part slides along the hatchback opening between said closed position and said open position in response to said top and bottom hatchback lid parts being folded between a flat planar position and a folded overlapping position;

a second guide element adapted to pivotally connect said bottom hatchback lid part to the hatchback opening of the vehicle for pivoting said bottom hatchback lid part between an open position and a closed position covering the remaining portion of the hatchback opening and adapted to slidably connect said bottom hatchback lid part to the hatchback opening such that said bottom hatchback lid part slides along the hatchback opening between said closed position and said open position in response to said top and bottom hatchback lid parts being folded between said flat planar position and said folded overlapping position; and a joint connection pivotally interconnecting said top hatchback lid part and said bottom hatchback lid part whereby said top and bottom hatchback lid parts are automatically folded between said generally flat planar aligned position and said folded overlapping position in response to one of said top and bottom hatchback lid parts being pivoted from said closed position to said open position.

11. A hatchback lid for opening and closing a hatchback opening of a motor vehicle comprising:

a top hatchback lid part;

a bottom hatchback lid part;

a first guide element adapted to pivotally and slidably connect said top hatchback lid part to the hatchback opening of the vehicle for pivoting and sliding said top hatchback lid part between an open position and a closed position covering at least a portion of the hatchback opening;

a second guide element adapted to pivotally and slidably connect said bottom hatchback lid part to the hatchback opening of the vehicle for pivoting and sliding said bottom hatchback lid part between an open position and a closed position covering the remaining portion of the hatchback opening;

a joint connection pivotally interconnecting said top hatchback lid part and said bottom hatchback lid part whereby said top and bottom hatchback lid parts are automatically folded between a generally flat planar aligned position and a folded overlapping position in response to one of said top and bottom hatchback lid parts being pivoted from said closed position to said open position and said other one of said top and bottom hatchback lid part being slid from said closed position to said open position; and said first and second guide elements provide sliding movement of said hatchback lid in said folded overlapping position between a completely open position adjacent the top of the hatchback opening and a bottom resting position adjacent the bottom of the hatchback opening.

\* \* \* \* \*

UNITED STATES PATENT AND TRADEMARK OFFICE
CERTIFICATE OF CORRECTION

PATENT NO.      : 6,505,882 B1
DATED           : January 14, 2003
INVENTOR(S)     : Morbach et al.

It is certified that error appears in the above-identified patent and that said Letters Patent is hereby corrected as shown below:

Column 2,
Line 46, delete "drawing" and insert -- drawings -- therefor.
Line 47, delete "contains" and insert -- contain -- therefor.

Column 3,
Line 26, insert -- . -- after "6" to read -- lid part 6. --
Line 26, delete "there" and insert -- There -- therefor.
Line 65, insert -- . -- after "position" to read -- resting position. --.

Column 5,
Lines 12 and 20, delete "area" and insert -- areas -- therefor.

Column 6,
Line 39, delete "part" and insert -- parts -- therefor.

Signed and Sealed this

Twentieth Day of May, 2003

JAMES E. ROGAN
*Director of the United States Patent and Trademark Office*